United States Patent
Tseng et al.

(10) Patent No.: US 9,731,617 B2
(45) Date of Patent: Aug. 15, 2017

(54) PATTERN BASED CHARGE SCHEDULING

(71) Applicant: FORD GLOBAL TECHNOLOGIES, LLC, Dearborn, MI (US)

(72) Inventors: Fling Tseng, Ann Arbor, MI (US); Hsin-hsiang Yang, Ann Arbor, MI (US); Kwaku O. Prakah-Asante, Commerce Township, MI (US); John Ottavio Michelini, Sterling Heights, MI (US); Dimitar Petrov Filev, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 270 days.

(21) Appl. No.: 14/560,323

(22) Filed: Dec. 4, 2014

(65) Prior Publication Data
US 2016/0159240 A1    Jun. 9, 2016

(51) Int. Cl.
*B60L 11/18*    (2006.01)
*H02J 7/14*    (2006.01)

(52) U.S. Cl.
CPC ....... *B60L 11/1851* (2013.01); *B60L 11/1809* (2013.01); *B60L 11/1838* (2013.01); *B60L 11/1861* (2013.01); *B60L 11/1862* (2013.01); *H02J 7/1446* (2013.01); *Y02T 10/7005* (2013.01)

(58) Field of Classification Search
CPC .............. B60L 11/1809; B60L 11/1861; B60L 11/1838; B60L 11/1862; H02J 7/1446
USPC ......................................................... 320/104
See application file for complete search history.

(56) References Cited

U.S. PATENT DOCUMENTS

| | | | |
|---|---|---|---|
| 8,704,495 B2 | 4/2014 | Sakai | |
| 8,706,333 B2 | 4/2014 | Li | |
| 8,744,641 B2 | 6/2014 | Ito | |
| 2005/0083175 A1* | 4/2005 | Yanagimoto | B60C 23/0433 340/5.72 |
| 2012/0112696 A1 | 5/2012 | Ikeda et al. | |
| 2012/0133337 A1 | 5/2012 | Rombouts et al. | |
| 2012/0290159 A1 | 11/2012 | McGee et al. | |
| 2013/0006454 A1 | 1/2013 | Li et al. | |
| 2013/0249483 A1* | 9/2013 | Iida | B60L 11/1861 320/109 |
| 2014/0176079 A1 | 6/2014 | Ito | |
| 2015/0274028 A1* | 10/2015 | Payne | B60L 11/1861 701/22 |
| 2015/0304406 A1* | 10/2015 | Penilla | G01C 21/26 709/203 |
| 2015/0329003 A1* | 11/2015 | Li | B60L 11/1816 320/134 |
| 2016/0198002 A1* | 7/2016 | Penilla | H04W 4/003 709/228 |

FOREIGN PATENT DOCUMENTS

| | | |
|---|---|---|
| JP | 2011188731 A | 9/2011 |
| JP | 2013051809 A | 3/2013 |

* cited by examiner

*Primary Examiner* — Stacy Whitmore
(74) *Attorney, Agent, or Firm* — Carlson, Gaskey & Olds

(57) ABSTRACT

A method according to an exemplary aspect of the present disclosure includes, among other things, scheduling charging of an energy storage device of an electrified vehicle based on a learned key-on pattern. The learned key-on pattern is derived by recursively updating the probability that a subsequent key-on event is likely to occur at any given time and day.

22 Claims, 5 Drawing Sheets

PATTERN BASED CHARGE SCHEDULING

TECHNICAL FIELD

This disclosure relates to a vehicle system and method associated with an electrified vehicle. The vehicle system is configured to schedule charging of an energy storage device of the electrified vehicle based on a learned key-on pattern.

BACKGROUND

The need to reduce fuel consumption and emissions in vehicles is well known. Therefore, vehicles are being developed that reduce or completely eliminate reliance on internal combustion engines. Electrified vehicles are one type of vehicle currently being developed for this purpose. In general, electrified vehicles differ from conventional motor vehicles in that they are selectively driven by one or more battery powered electric machines. Conventional motor vehicles, by contrast, rely exclusively on the internal combustion engine to drive the vehicle.

A powertrain of an electrified vehicle is typically equipped with a high voltage battery pack having battery cells that store electrical power for powering the electric machines. The battery cells must be charged prior to vehicle use. When parked, some electrified vehicles, such as plug-in hybrid electric vehicles or battery electric vehicles, may connect to an external power source to recharge the battery cells. Typically, charging starts as soon as the external power source is connected to the battery. Maintaining the batteries at a relatively high state of charge for prolonged periods of time can negatively impact battery cell capacity and aging (i.e., reduced overall capacity and performance in terms of charging/discharging capabilities).

SUMMARY

A method according to an exemplary aspect of the present disclosure includes, among other things, scheduling charging of an energy storage device of an electrified vehicle based on a learned key-on pattern. The learned key-on pattern may be derived by recursively updating the probability that a subsequent key-on event is likely to occur at any given time and day.

In a further non-limiting embodiment of the foregoing method, the scheduling step includes scheduling a charging start time and a charging end time for charging the energy storage device.

In a further non-limiting embodiment of either of the foregoing methods, the scheduling step includes estimating an energy requirement for an upcoming trip and charging the energy storage device to a level sufficient to meet the energy requirement prior to a predicted upcoming key-on event.

In a further non-limiting embodiment of any of the foregoing methods, the energy requirement is learned based on a learned driving pattern of the electrified vehicle.

In a further non-limiting embodiment of any of the foregoing methods, the learned key-on pattern is learned at a predefined learning rate.

In a further non-limiting embodiment of any of the foregoing methods, the predefined learning rate is at least 100 key-on events.

In a further non-limiting embodiment of any of the foregoing methods, the updating step includes applying a low pass filter to each of a plurality of key-on signals.

In a further non-limiting embodiment of any of the foregoing methods, upon receiving a key-on signal, the updating step includes increasing the probability that the subsequent key-on event will occur on the same day and the same time as the key-on signal and decreasing the probability that the subsequent key-on event will occur at a different day and a different time from the key-on signal.

In a further non-limiting embodiment of any of the foregoing methods, the updating step includes partitioning each day of a week into a plurality of predefined segments, and each time another key-on event occurs, updating the probability that the subsequent key-on event is likely to occur during the same predefined segment.

In a further non-limiting embodiment of any of the foregoing methods, the updating step includes increasing the probability that the subsequent key-on event will occur on the same day and the same time as each key-on signal occurs and decreasing the probability that the subsequent key-on event will occur at a different day and a different time than each key-on signal occurred.

In a further non-limiting embodiment of any of the foregoing methods, the method includes performing a learning process for learning the key-on pattern. The learning process includes identifying a driver operator associated with the electrified vehicle.

In a further non-limiting embodiment of any of the foregoing methods, the learning process includes confirming a first key-on event and communicating a first key-on signal indicative of the first key-on event.

In a further non-limiting embodiment of any of the foregoing methods, the learning process includes accessing key-on probability information associated with the driver operator.

In a further non-limiting embodiment of any of the foregoing methods, the learning process includes modifying the key-on probability information by either increasing or decreasing the probability that the subsequent key-on event will occur at the same time and same day as the first key-on event.

In a further non-limiting embodiment of any of the foregoing methods, the method includes charging the energy storage device base on a charging schedule derived from the learned key-on pattern.

A vehicle system according to another exemplary aspect of the present disclosure includes, among other things, an electrical storage device and a control module configured to schedule charging of the electrical storage device based on a learned key-on pattern that is derived by recursively updating the probability that a subsequent key-on event is likely to occur at any given time and day.

In a further non-limiting embodiment of the foregoing vehicle system, a power electronics module is configured to control charging of the electrical storage device.

In a further non-limiting embodiment of either of the foregoing vehicle systems, a charger is configured to supply electrical power to the power electronics module.

In a further non-limiting embodiment of any of the foregoing vehicle systems, the control module includes a processing unit and non-transitory memory, and a key-on probability plot is stored in the non-transitory memory.

In a further non-limiting embodiment of any of the foregoing vehicle systems, the control module is configured to estimate an energy requirement for an upcoming trip.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to a vehicle system and method for scheduling charging of an energy storage device of an electrified vehicle. In some embodiments, the charging schedule of the energy storage device is determined based on a learned key-on pattern associated with the electrified vehicle. The learned key-on pattern may be derived, using a predefined learning rate, from a low pass filter update of each key-on signal of the electrified vehicle. In other embodiments, the battery charging schedule may be based on an estimated energy requirement for an upcoming trip. These and other features are discussed in greater detail in the following paragraphs of this detailed description.

Figure 1:
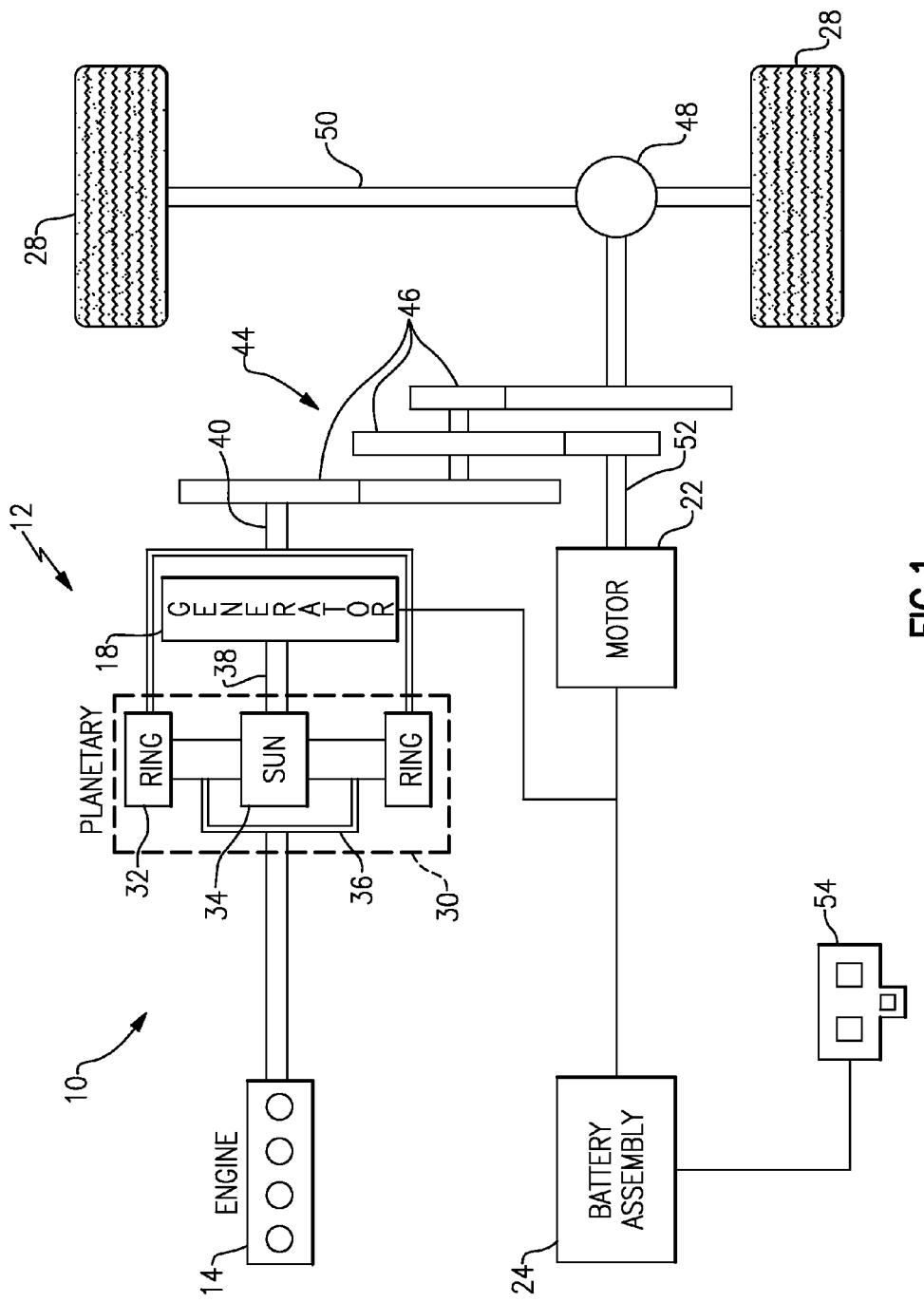
FIG. 1 schematically illustrates a powertrain of an electrified vehicle.

FIG. 1 schematically illustrates a powertrain 10 of an electrified vehicle 12. The electrified vehicle 12 is depicted as a plug-in hybrid electric vehicle (PHEV) in this embodiment; however, it should be understood that the concepts of this disclosure are not limited to PHEV's and could extend to other electrified vehicles, including, but not limited to, battery electric vehicles (BEV's).

In one non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the electrified vehicle 12.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an example type of electrified vehicle battery assembly. The battery assembly 24 may include a high voltage battery pack that is capable of outputting electrical power to operate the motor 22 and the generator 18. Other types of energy storage devices and/or output devices can also be used to electrically power the electrified vehicle 12.

In a non-limiting PHEV embodiment of the electrified vehicle 12, the battery assembly 24 may be recharged or partially recharged using a charging adapter 54 that is connected to a charging station powered by an external power source, such as an electrical grid, a solar panel, or the like.

In one non-limiting embodiment, the electrified vehicle 12 has at least two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally not permitted to operate under a default EV mode but could be operated as necessary based on a vehicle system state or as permitted by the operator.

The electrified vehicle 12 may additionally be operated in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion usage. The electrified vehicle 12 may be operated in other operating modes in addition to the EV and HEV modes.

Figure 2:
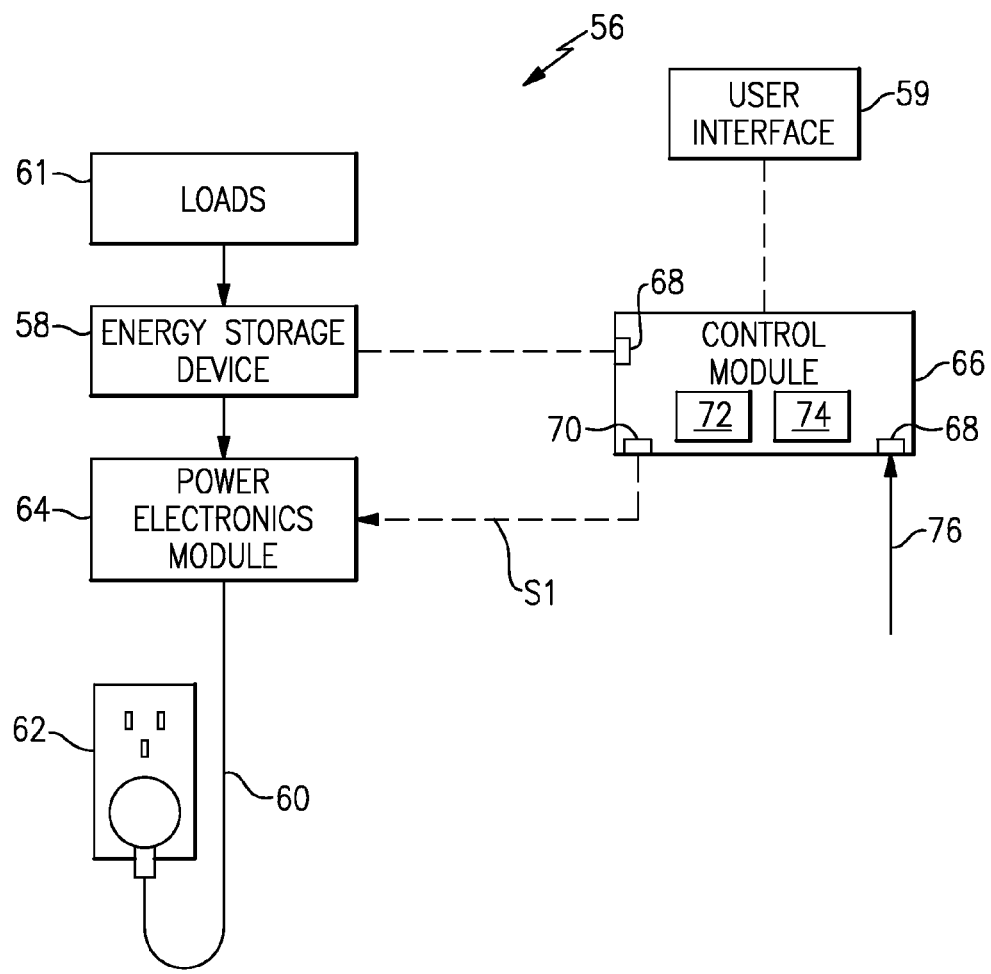
FIG. 2 illustrates a vehicle system of an electrified vehicle.

FIG. 2 is a highly schematic depiction of a vehicle system 56 that may be incorporated into a vehicle, such as the electrified vehicle 12 of FIG. 1. The vehicle system 56 is adapted to schedule charging of an energy storage device 58 based on a learned key-on pattern associated with the electrified vehicle. In one non-limiting embodiment, the exemplary vehicle system 56 includes the energy storage device 58, a charger 60, an external power source 62, a power electronics module 64 and a control module 66.

The energy storage device 58 may include one or more battery cells and/or capacitors. The energy storage device 58 stores electrical energy that may be supplied to electrical loads 61 residing on-board the vehicle. The electrical loads 61 may include high voltage electrical loads (e.g., electric machines, etc.) or low voltage electrical loads (e.g., lighting systems, low voltage batteries, logic circuitry, etc.).

The charger 60 selectively supplies the energy required to charge the energy storage device 58. The charger 60 connects between the energy storage device 58 and the external power source 62. In one embodiment, the charger 60 plugs into the external power source 62 to receive electrical power and deliver it to the energy storage device 58.

The power electronics module 64 may control whether or not electrical power from the external power source 62 is delivered to the energy storage device 58 for charging. In one embodiment, the power electronics module 64 includes a plurality of switching units, such as integrated gate bipolar transistors or the like, that support bidirectional power flow within the vehicle system 56, including to and from the energy storage device 58. In other embodiments, the power electronics module 64 includes an inverter system for converting between an alternating current (AC) and a direct current (DC) and/or a converter system for modifying voltages of electrical signals.

Electrical power from the external power source 62 may be periodically supplied to the energy storage device 58 according to a charging schedule. In one embodiment, the power electronics module 64 controls the charging rate of the energy storage device 58 based on a charging schedule commanded by the control module 66. For example, the control module 66 may communicate a charging schedule signal S1 to the power electronics module 64 that indicates a charging start time and a charging end time, among other information. In response to receiving the charging schedule signal S1, the power electronics module 64 is configured to permit electrical power to be delivered to the energy storage device 58 for charging at the indicated charging start time, and is configured to stop electrical power from being delivered to the energy storage device 58 after the charging end time.

The control module 66 may be part of an overall vehicle control unit, such as a vehicle system controller (VSC), or could alternatively be a stand-alone control unit separate from the VSC. In one embodiment, the control module 66 includes executable instructions for interfacing with and operating the various components of the vehicle system 56, including but not limited to the power electronics module 64 and the energy storage device 58. The control module 66 may include multiple inputs 68 and outputs 70 for interfacing with the various components of the vehicle system 56. In another embodiment, the control module 66 includes a processing unit 72 and non-transitory memory 74 for executing the various control strategies and modes of the vehicle system 56.

The control module 66 may monitor and receive a key-on signal 76 at one of the inputs 68 each time the vehicle equipped with the vehicle system 56 is keyed-on by a driver operator. The key-on signals 76 may be communicated to the control module 66 using a common protocol (e.g., CAN) to reflect each key-on event. In one embodiment, the control module 66 is adapted to schedule charging of the energy storage device 58 based on a learned key-on pattern that can be derived by analyzing the key-on signals 76. For example, based on the learned key-on pattern for a given time and day, the control module 66 can communicate the charging schedule signal S1 to the power electronics module 64. The energy storage device 58 can then be charged to a required state of charge as close as possible to the next predicted (e.g., upcoming) key-on event. In this way, the energy storage device 58 is not maintained at a relatively high state of charge for prolonged periods of time. Details concerning the control strategy for learning a driver operator's key-on pattern are provided below with reference to FIG. 3.

In another embodiment, the vehicle system 56 includes a user interface 59 for communicating information to the driver operator. For example, the charging schedule can be presented for the driver operator's review on the user interface 59. The user interface 59 can also be used to confirm, modify or update the charging schedule. In other embodiments, the user interface 59 may be configured to communicate reminders to the driver operator concerning predicted upcoming key-on events, may arrange vehicle pre-conditioning in association with upcoming expected trips, and could also be pre-filled with predicted key-on patterns.

Figure 3:
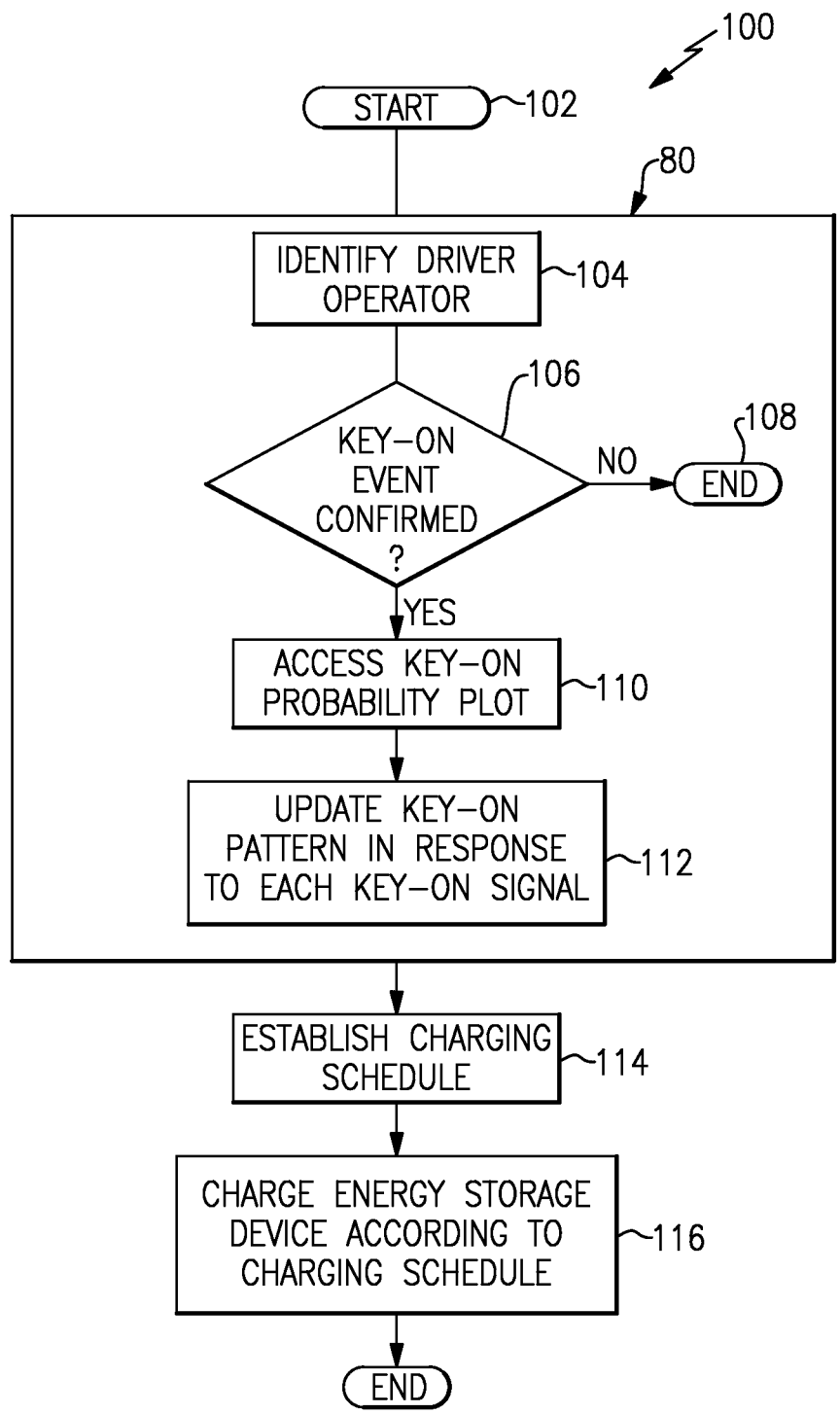
FIG. 3 schematically illustrates a control strategy for scheduling charging of an energy storage device of an electrified vehicle.

FIG. 3, with continued reference to FIGS. 1-2, schematically illustrates a control strategy 100 for controlling the vehicle system 56 described above. The control strategy 100 may be performed to schedule charging of an energy storage device 58 of the electrified vehicle 12 based on a learned key-on pattern associated with the electrified vehicle 12. The control module 66 may be programmed with one or more algorithms adapted to execute the control strategy 100, or any other control strategy. In one non-limiting embodiment, the control strategy 100 may be stored as executable instructions in the non-transitory memory 74 of the control module 66. In another embodiment, the learned key-on probability may be learned over multiple drive cycles and stored in one or more look-up tables in the non-transitory memory 74.

As shown in FIG. 3, the control strategy 100 begins at block 102. The control strategy 100 may next undergo a learning process 80 for learning the key-on pattern associated with the electrified vehicle 12 for a given driver operator. In one embodiment, the learning process 80 is a recursive, iterative process that updates in response to each key-on signal 76 that is communicated to the control module 66.

The learning process 80 begins at block 104 by identifying the driver operator. In one non-limiting embodiment, the driver operator may be identified using Ford Motor Company's MyKey® technology. Other identification methods are also contemplated within the scope of this disclosure.

Next, at block 106 of the learning process 80, a vehicle key-on event may be confirmed. The key-on event indicates that the driver operator has expressed an intent to start vehicle operation. Once confirmed, a key-on signal 76 may be communicated to the control module 66. Although referred to herein as a "key-on" event, it should be appreciated that the driver operator may indicate the intent to operate the vehicle with or without the use of an actual key. For example, vehicle operation may be initiated by inserting a key (active key) into an ignition slot and moving the slot to an "ON" position. Alternatively, vehicle operation may be initiated when a key (passive key) is positioned within a threshold distance of the vehicle (e.g., in the vehicle). In another embodiment, vehicle operation may be initiated when the operator presses an ignition button to an "ON" position. Other approaches may also be used by a driver operator to indicate intent to operate the vehicle within the scope of this disclosure. If a vehicle key-on event has not been confirmed after a predefined period of time, the control strategy 100 may end at block 108.

Figure 4:
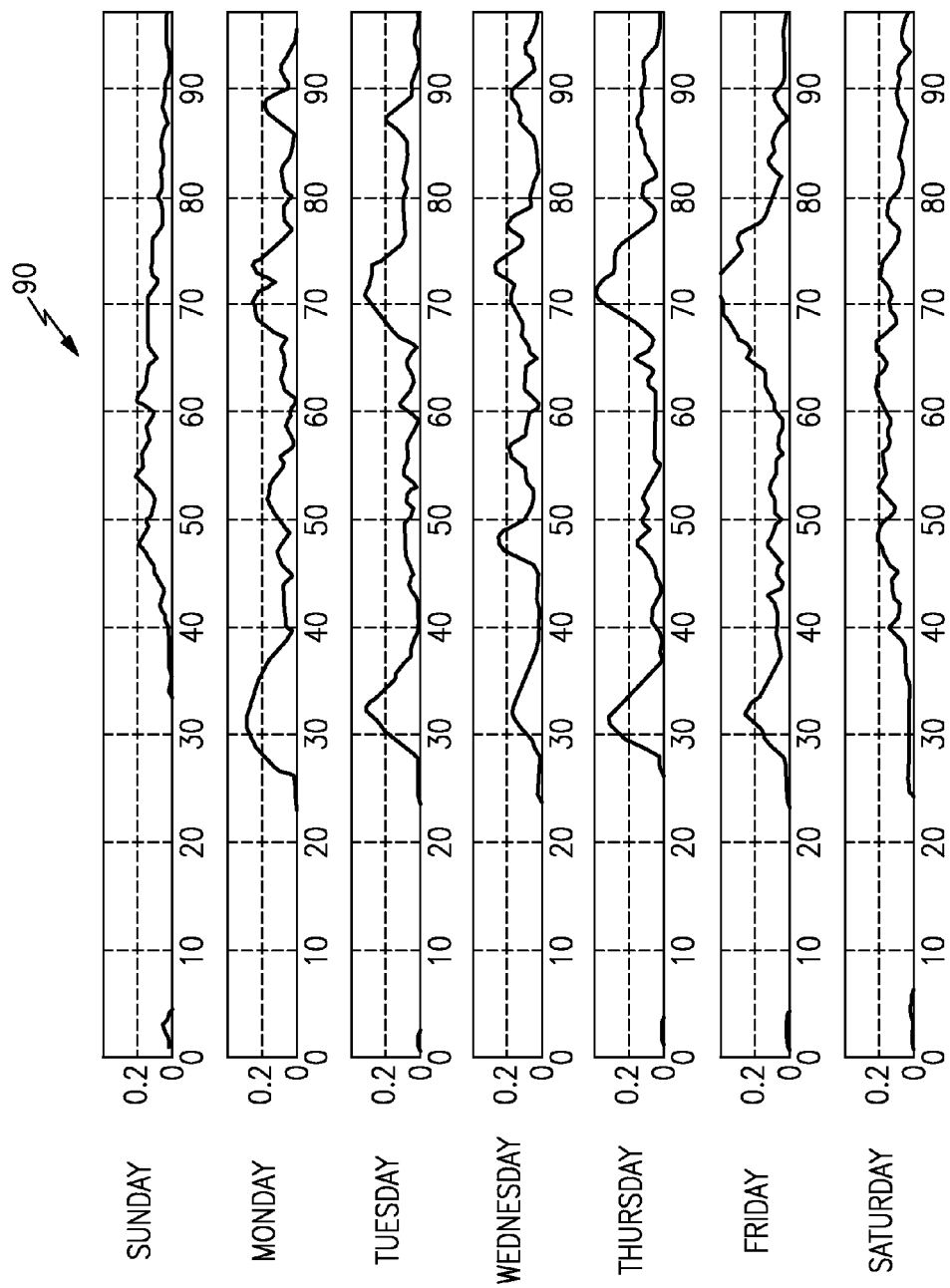
FIG. 4 schematically illustrates a plot of key-on probabilities associated with a given driver operator of an electrified vehicle.

Upon confirming a key-on event, the learning process 80 may continue to block 110 by accessing a key-on probability plot 90 (see FIG. 4) associated with the driver operator previously identified at block 104. The key-on probability plot 90 may be stored in the non-transitory memory 74 of the control module 66. The key-on probability plot 90 depicts the identified driver operator's key-on behavior information for all seven days of a week (Sunday through Saturday) as shown on the vertical axes of the key-on probability plot 90. The twenty-four hours of each day of the week are represented on the horizontal axes. As such, the key-on probability plot 90 provides information related to the likelihood that the driver operator may key-on to start the vehicle at any given time and on any given day of the week.

Each day of the week may be partitioned into a plurality of predefined segments. The key-on probability plot 90 therefore demonstrates, for each of the predefined segments, the probability that a subsequent key-on event is likely to occur during that predefined segment. In one non-limiting embodiment, the predefined segments are partitioned into fifteen minute time segments (shown as 0 to 96 on horizontal axes of FIG. 4). It should, however, be appreciated that the predefined segments can be partitioned into any time increments. Partitioning each day of the week into smaller segments improves the accuracy of the learning process 80.

By way of a non-limiting illustration, assume a driver operator has a trip vector with a key-on at 7:30 AM, a key-off event at 8:30 AM, and the vehicle is stopped at its destination for 3 hours and 30 minutes. Utilizing this information, the time segment closest to 7:30 AM will receive a positive update with its key-on probability value increased, and the time segments up to 12:00 PM will receive a negative update with their key-on probability values decreased. All other time segments not part of the trip will receive no update based on this trip vector. This procedure may continue with the completion of each new trip from which key-on probability patterns are captured and updated reflecting the driver operator's most recent usage of the vehicle.

For each confirmed key-on event, the key-on pattern associated with the driver operator may be updated, or adjusted, in a recursive procedure at block 112. This step may include adjusting the key-on probability plot 90 to either increase or decrease the probability that a subsequent key-on event will occur at the same time and same day as the confirmed key-on event. In one embodiment, a low pass filter, which may executed by the control module 66, is applied to each key-on signal 76. A positive increment (i.e., an increase in the probability) is assigned to the predefined segment that matches the time and day of each key-on signal 76, whereas a negative increment (i.e., a decrease in the probability) is assigned to all other predefined segments that do not match the time and day of each key-on signal.

In another embodiment, the learning process 80 may be performed using a predefined learning rate. The predefined learning rate represents the amount of key-on events that are reflected in the learned key-on pattern, and thus the key-on probability plot 90, and may be indicative of how fast the learning process 80 is performed. In one non-limiting embodiment, the predefined learning rate is at least 100 key-on events (i.e., at least 100 key-on signals 76 (or learning rate of 0.01) are filtered, analyzed and reflected in the key-on probability plot 90). However, the predefined learning rate is design specific and could be set at any rate.

Based on the learned key on-pattern, a charging schedule for charging the energy storage device 58 can be established at block 114. In one embodiment, based on the learned key-on pattern, the control module 66 can communicate the charging schedule signal S1 to the power electronics module 64 for preparing to charge the energy storage device 58. The charging schedule signal S1 may include details concerning the charging schedule, including a charging start time and a charging end time. Finally, at block 116, the energy storage device 58 is charged according to the charging schedule.

In another embodiment, as part of the charging schedule, predictive information about a subsequent key-on event may be communicated to the driver operator at a user interface of the vehicle. Portions of or the entire charging schedule may be automatically pre-filled into the user interface based on the learned key-on pattern. In yet another embodiment, when reminding the driver operator to plug in the charger 60, predictive information for the next likely key-on event can be displayed on the user interface. The driver operator may be provided with the ability to modify this information as desired.

Figure 5:
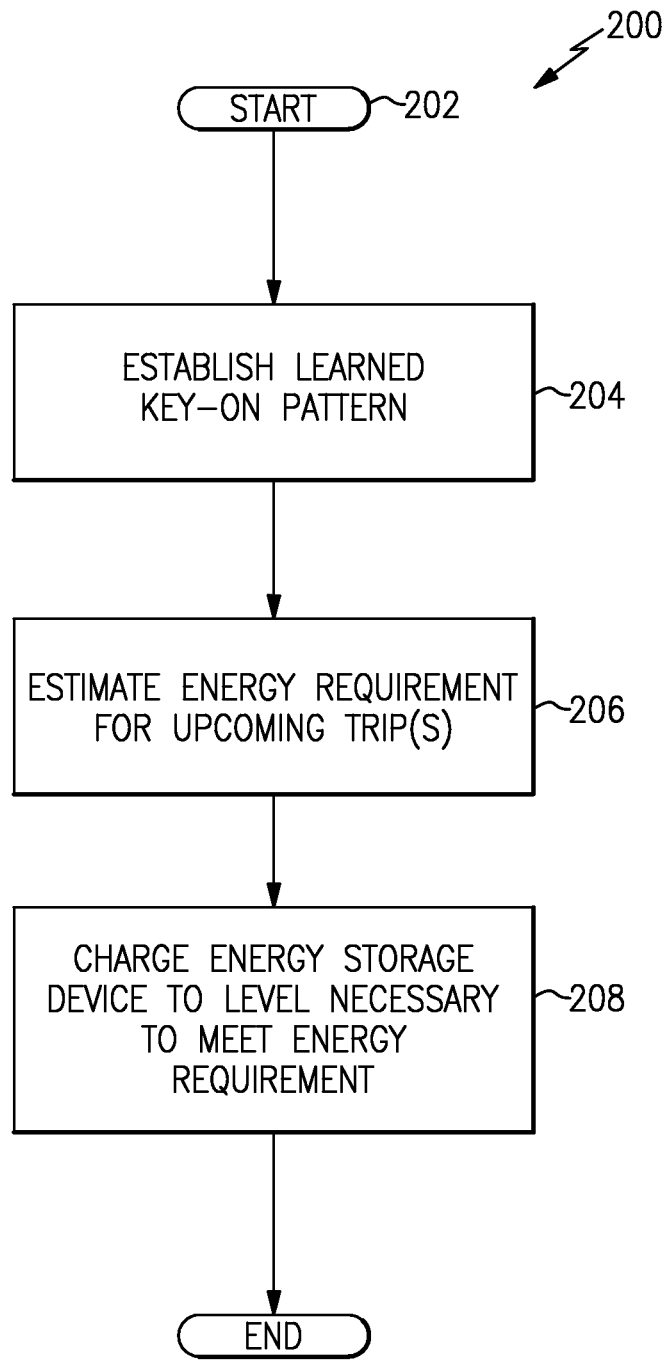
FIG. 5 schematically illustrates another control strategy for scheduling charging of an energy storage device of an electrified vehicle.

FIG. 5 schematically illustrates another control strategy 200 for scheduling charging of the energy storage device 58 of the vehicle system 56. The control strategy 200 may be executed to minimize the cost of charging the energy storage device 58.

The control strategy 200 begins at block 202. At block 204, a learned key-on pattern associated with a driver operator of a vehicle may be established. The learned key-on pattern may be derived using the learning process 80 described above and shown in FIG. 3.

An energy requirement for an upcoming trip is estimated at block 206. The energy requirement estimation may represent the amount of energy required to power the electrified vehicle during an upcoming trip or during several upcoming trips. The energy requirement may be learned over a number of previous vehicle drive cycles based on one or more of frequent trip time patterns, habitual probability patterns, route based statistical profiles, and environmental attribute profiles. Other statistical profiles and aspects of a driver operator's driving behavior may additionally or alternatively be used.

In one non-limiting embodiment, estimation of the energy requirement may be learned over multiple vehicle drive cycles and stored in one or more look-up tables in the non-transitory memory 74 of the control module 66. The control module 66 may learn origin characteristics including time and geographic location of each key-on event. For example, based on information from a vehicle navigation system (e.g., GPS device), the control module 66 may determine the origin characteristics. The time may include a time of day when the vehicle is travelling, a date of travel, which day of the week the vehicle is travelling, etc. In this way, the control module 66 may determine an amount of time the vehicle was stopped at a location (e.g., the point of origin) before beginning a trip. The control module 66 may also learn details regarding a route of vehicle travel including road segments traveled. This may include a planned route of travel, an actual route of travel, and differences between the planned and actual route of travel. The details may be learned based on information from the vehicle navigation system, for example.

In yet another embodiment, the control module 66 may learn operating conditions of vehicle travel. These may include, for example, frequency of brake and accelerator pedal application, frequency of brake and accelerator pedal release, transmission gear change frequency, duration of operation in electric mode versus engine mode, road and traffic conditions, changes in vehicle speed and engine speed, etc.

In yet another embodiment, the control module 66 may learn destination characteristics including time of travel from point of origin to destination, location of the destination, time taken to reach the destination, time of arrival at destination (including time of day, date, day of week and other details). The control module 66 may also learn relations between the destination characteristics and the origin characteristics such that tables related to operator driving patterns may be populated and uploaded in order to estimate the energy requirements for upcoming trips.

Finally, at block 208, the energy storage device 58 may be charged to a level sufficient to meet the energy requirement previously calculated at block 206. In one embodiment, the energy storage device 58 is charged to a state of charge sufficient to meet the energy requirement at a point in time just prior to a predicted upcoming key-on event. The predicted upcoming key-on event may be estimated from the learned key-on pattern obtained from block 204.

For example, if the driver operator plugs the charger 60 (see FIG. 2) into the electrified vehicle at 9:00 pm Sunday evening and the next likely key-on event is predicted as occurring at 7:30 am on a Monday morning, charging of the energy storage device 58 can be scheduled to finish at some point in time before 7:30 am. The charging can also delayed so it does not begin until some point after 9:00 pm but before 7:30 am. Scheduling charging in this manner may allow the energy storage device 58 to be charged using off-peak electricity pricing, thereby reducing charging costs.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
scheduling charging of an energy storage device of an electrified vehicle based on a learned key-on pattern, the learned key-on pattern derived by recursively updating the probability that a subsequent key-on event is likely to occur at any given time and day each time a key-on signal associated with the electrified vehicle is received,
charging the energy storage device based on a charging schedule derived from the learned key-on pattern.

2. The method as recited in claim 1, wherein the scheduling step includes scheduling a charging start time and a charging end time for charging the energy storage device.

3. The method as recited in claim 1, wherein the scheduling step includes:
estimating an energy requirement for an upcoming trip; and
charging the energy storage device to a level sufficient to meet the energy requirement prior to a predicted upcoming key-on event.

4. The method as recited in claim 3, wherein the energy requirement is learned based on a learned driving pattern of the electrified vehicle.

5. The method as recited in claim 1, wherein the learned key-on pattern is learned at a predefined learning rate.

6. The method as recited in claim 5, wherein the predefined learning rate is at least 100 key-on events.

7. The method as recited in claim 1, wherein the updating step includes applying a low pass filter to each of a plurality of key-on signals.

8. The method as recited in claim 1, wherein, upon receiving each key-on signal, the updating step includes:
increasing the probability that the subsequent key-on event will occur on the same day and the same time as the key-on signal; and
decreasing the probability that the subsequent key-on event will occur at a different day and a different time from the key-on signal.

9. The method as recited in claim 1, wherein the updating step includes:
partitioning each day of a week into a plurality of predefined segments; and
each time another key-on event occurs, updating the probability that the subsequent key-on event is likely to occur during the same predefined segment.

10. The method as recited in claim 9, wherein the updating step includes:
increasing the probability that the subsequent key-on event will occur on the same day and the same time as each key-on signal occurs; and
decreasing the probability that the subsequent key-on event will occur at a different day and a different time than each key-on signal occurred.

11. The method as recited in claim 1, comprising performing a learning process for learning the key-on pattern, wherein the learning process includes:
identifying a driver operator associated with the electrified vehicle.

12. The method as recited in claim 11, wherein the learning process includes:
confirming a first key-on event; and
communicating a first key-on signal indicative of the first key-on event.

13. The method as recited in claim 12, wherein the learning process includes:
accessing key-on probability information associated with the driver operator.

14. The method as recited in claim 13, wherein the learning process includes:
modifying the key-on probability information by either increasing or decreasing the probability that the subsequent key-on event will occur at the same time and same day as the first key-on event.

15. The method as recited in claim 1, wherein recursively updating the probability that the subsequent key-on event is likely to occur at any given time and day includes adjusting a key-on probability plot to either increase or decrease the probability that the subsequent key-on event will occur at the same time and same day as a confirmed key-on event.

16. A vehicle system, comprising:
an electrical storage device; and
a control module configured to charge of said electrical storage device based on a learned key-on pattern that is derived by recursively updating the probability that a subsequent key-on event is likely to occur at any given time and day each time a key-on signal is received by said control module.

17. The vehicle system as recited in claim 16, comprising a power electronics module configured to control charging of said electrical storage device.

18. The vehicle system as recited in claim 17, comprising a charger configured to supply electrical power to said power electronics module.

19. The vehicle system as recited in claim 16, wherein said control module includes a processing unit and non-transitory memory, and a key-on probability plot is stored in said non-transitory memory.

20. The vehicle system as recited in claim 16, wherein said control module is configured to estimate an energy requirement for an upcoming trip.

21. The vehicle system as recited in claim 16, wherein said control module adjusts a key-on probability plot when recursively updating the probability.

22. A method, comprising:
charging an energy storage device of an electrified vehicle based on a learned key-on pattern that is derived by recursively updating the probability that a subsequent key-on event is likely to occur at any given time each time a key-on signal is received, wherein the updating includes increasing or decreasing the probability that the subsequent key-on event will occur at the same time as previous key-on events.

* * * * *

UNITED STATES PATENT AND TRADEMARK OFFICE
CERTIFICATE OF CORRECTION

PATENT NO. : 9,731,617 B2  
APPLICATION NO. : 14/560323  
DATED : August 15, 2017  
INVENTOR(S) : Fling Tseng et al.

Page 1 of 1

It is certified that error appears in the above-identified patent and that said Letters Patent is hereby corrected as shown below:

In the Claims

In Claim 16, Column 11, Line 11; after "configured to" replace "charge of" with --charge--

Signed and Sealed this
Fifteenth Day of May, 2018

Andrei Iancu
*Director of the United States Patent and Trademark Office*